3,130,236
PROCESS OF REMOVING FORMALDEHYDE FROM 1,4-BUTYNEDIOL

Peter O. Shull, South Plainfield, N.J., assignor to General Aniline & Film Corporation, New York, N.Y., a corporation of Delaware
No Drawing. Filed June 20, 1960, Ser. No. 37,063
3 Claims. (Cl. 260—637)

This invention relates to an improved process of reducing the formaldehyde content from 1,4-butynediol, hereinafter referred to as butynediol.

The hydrogenation of butynediol to butenediol and to butanediol in the presence of a number of different catalysts and by a number of different procedures is well known. The current commercial procedure involves the catalytic reduction of either aqueous butynediol or undiluted liquid butynediol to either butenediol or butanediol with metal catalysts and hydrogen at temperatures ranging from 100 to 300° C. and a pressure of 1000 to 3000 pounds per square inch gauge (p.s.i.g.). Both the undiluted and aqueous butynediol contain formaldehyde, and as a consequence, the life of the metal catalyst is adversely affected. In other words, the presence of formaldehyde in the feed forms undesirable by-products, composition unknown. This lowers the yield to a considerable extent (5–20%), in addition the quality of the product is poor (solidification point—lower than specification). Catalyst life is also severely reduced.

To overcome the foregoing difficulties, many pretreatments are currently in use such as distillation, chemical pretreatment with caustic soda, etc. The end result of all such treatments is to bring the formaldehyde level to 0.2% or less so as to extend the metal catalyst activity over a longer period of time. All of these methods while workable, add considerable cost to the process.

It is the principal object of the present invention to provide a simplified method of reducing the formaldehyde level in butynediol, either aqueous or undiluted prior to catalytic reduction thereof to either butenediol or butanediol.

Other objects and advantages will become more clearly manifest from the following description:

I have found a novel and relatively inexpensive method in which the formaldehyde level in aqueous butenediol or undiluted butenediol is substantially reduced by heating the butynediol to a temperature of 125 to 200° C. for a period of time ranging from 2 to 8 hours. During this heating the pressure developed may range from 25 to 250 p.s.i.g. The final formaldehyde content is a function of time and temperature. In other words, the higher the temperature and longer time reduces the formaldehyde level below 0.1%. Longer time with lower temperatures reduces the formaldehyde level to approximately 0.2% and below. The ideal temperature and time for commercial aqueous butynediol of 35% concentration is 150–175° C. and heating time of 2 to 6 hours.

By the foregoing heating treatment the formaldehyde and other organic compounds containing a carbonyl group are reduced to a level which do not adversely affect the catalyst life during the hydrogenation of the butynediol.

The "carbonyl number" which is a measure of formaldehyde and other carbonyl groups is determined by reacting the test mixture with hydroxylamine hydrochloride at a pH of 3.1 after a settling period of at least ½ hour. The solution is back titrated with N/10 sodium hydroxide to a pH of 3.1.

The formaldehyde content is determined by the chromotropic acid methods. Formaldehyde gives a violet-pink color with chromotropic in strong sulfuric acid solution. The intensity of the violet color is measured at 575 mu and compared with formaldehyde standards.

The following examples will show in greater detail the actual reduction of formaldehyde content by treating butynediol in accordance with the foregoing procedure:

Example I

Into a 2½ liter stainless steel autoclave were charged 1800 grams of technical grade 35.0% aqueous butynediol solution and heated to 150° C. and held at this temperature while taking samples at intervals of 2 and 4 hour periods. The pressure at this temperature is approximately 50 p.s.i.g. The results after 10 hours are as follows:

| Sample | (Hours) Time on Temp. | Carbonyl No. | Percent Formaldehyde |
|---|---|---|---|
| 0 | 0 | 10.1 | 0.48 |
| 1 | 2 | 5.5 | 0.25 |
| 2 | 6 | 3.4 | 0.18 |
| 3 | 10 | 2.2 | 0.14 |

Example II

Into a 2½ liter stainless steel autoclave were charged 1800 grams of technical grade, 35% aqueous butynediol solution and heated to 175° C. While holding at this temperature, samples were taken at 2 hour intervals. The pressure at this temperature was approximately 110 p.s.i.g. The results obtained are as follows:

| Sample | (Hours) Time on Temp. | Carbonyl No. | Percent Formaldehyde |
|---|---|---|---|
| 0 | 0 | 10.1 | 0.48 |
| 1 | 2 | 2.1 | 0.19 |
| 2 | 4 | 1.6 | 0.10 |
| 3 | 6 | 1.9 | 0.10 |
| 4 | 8 | 1.9 | 0.08 |

Example III

Into a 2½ liter stainless steel autoclave were charged 1800 grams of 60% butynediol and heated to 175° C. while holding at this temperature and taking samples at two hour intervals. The pressure at this temperature was approximately 98 p.s.i.g. The results obtained are as follows:

| Sample | (Hours) Time on Temp. | Carbonyl No. | Percent Formaldehyde |
|---|---|---|---|
| 0 | 0 | 18 | 0.82 |
| 1 | 2 | 4 | 0.35 |
| 2 | 4 | 2.5 | 0.17 |
| 3 | 6 | 3.0 | 0.17 |
| 4 | 8 | 2.0 | 0.13 |

Example IV

Into a 2½ liter stainless steel autoclave were charged 1800 grams of 20% butynediol solution and heated to 175° C., pressure calculated 125 p.s.i.g., and held for 3 hours. The results obtained are as follows:

| Sample | (Hours) Time on Temp. | Carbonyl No. | Percent Formaldehyde |
|---|---|---|---|
| 0 | 0 | 6 | 29 |
| 1 | 3 | 1.3 | .09 |

I claim:
1. The process of reducing formaldehyde content from technical grade 35% aqueous 1,4-butynediol containing the same which consists of heating the said 1,4-butynediol at a temperature of 125 to 200° C. and a pressure of 25 to 250 p.s.i.g. for a period of time ranging from 2 to 10 hours to drop the initial formaldehyde content to a level ranging from 0.35% to 0.08% by weight of the said 1,4-butynediol.

2. The process of reducing the formaldehyde content from technical grade 35% aqueous 1,4-butynediol solution containing the same which consists of heating the said 1,4-butynediol at a temperature of 150° C. and a pressure of 50 p.s.i.g. for a period of time ranging from 2 to 10 hours to decrease the formaldehyde content to 0.14% by weight of the said 1,4-butynediol solution.

3. The process of reducing the formaldehyde content from technical grade 35% aqueous 1,4-butynediol solution containing the same which consists of heating the said 1,4-butynediol at a temperature of 175° C. and a pressure of 110 p.s.i.g. for a period of time ranging from 2 to 8 hours to decrease the formaldehyde content to 0.08% by weight of the said 1,4-butynediol solution.

References Cited in the file of this patent

UNITED STATES PATENTS

| | | |
|---|---|---|
| 2,276,564 | Cox | Mar. 17, 1942 |
| 2,806,892 | De Lorenzo | Sept. 17, 1957 |
| 2,967,893 | Hort et al. | Jan. 10, 1961 |